United States Patent [19]

Foster

[11] 3,979,943

[45] Sept. 14, 1976

[54] BELT WEIGHING MACHINES

[75] Inventor: George Ernest Foster, Redcar, England

[73] Assignee: British Steel Corporation, London, England

[22] Filed: Nov. 3, 1975

[21] Appl. No.: 628,065

[30] Foreign Application Priority Data
Nov. 4, 1974  United Kingdom............... 47527/74

[52] U.S. Cl. ........................................ 73/1 B; 177/1
[51] Int. Cl.² ................... G01G 23/00; G01G 9/00
[58] Field of Search ...................... 73/1 B; 177/1, 50

[56] References Cited
UNITED STATES PATENTS
3,396,573   8/1968   Blubaugh ............................. 73/1 B
3,850,023   11/1974  McDonald ............................ 73/1 B Primary Examiner—S. Clement Swisher
Attorney, Agent, or Firm—Bacon & Thomas

[57] ABSTRACT

A method of installing or adjusting belt weighing machines to reduce errors in the weights recorded applies to machines having a conveyor belt (25) which is driven over a series of idler rollers (22, 24, 23) in which one or more idler rollers (24) are supported by a weight sensing system. In a first adjustment the isolation of the weighlength is improved in a static test by altering the separation between the first threshold idler roller (A, A') and either the adjacent non-weighed idler roller (B, B') or the next but one weighed idler roller (D, D'). In a second adjustment the theoretical weighlength is adjusted by moving the first threshold idler rollers (A, A') to compensate for the disparity between static and dynamic test results.

6 Claims, 2 Drawing Figures

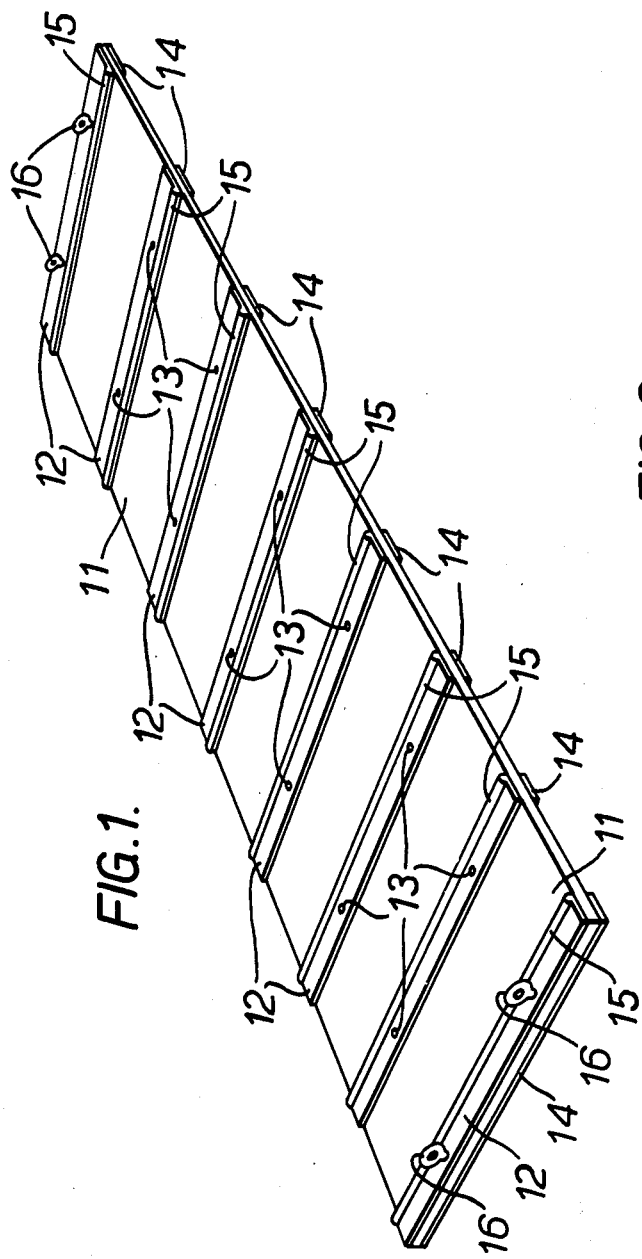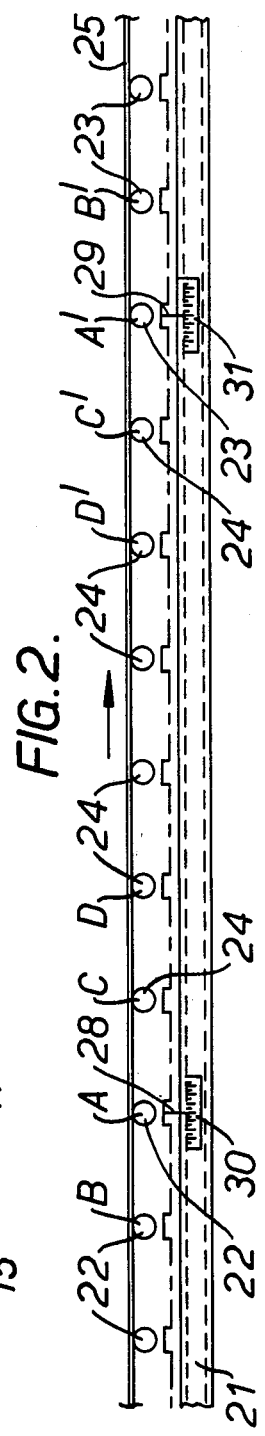

BELT WEIGHING MACHINES

This invention relates to belt weighing machines. It is particularly concerned with installing or adjusting the performance of such machines, such as by testing and calibrating the machines.

In many steel works very large quantities of material must accurately be monitored and controlled and this places an increasing dependence on belt weighing equipment for satisfactory plant operation. Many advances have been made in the design of load evaluation mechanisms covering mechanical lever systems with infinitely variable continuous integration or cyclic addition, the use of maintenance-free cross flexures and loadcell systems fitted with various output devices for electrical or mechanical machines including flow rate indication, accumulating counters and measurement for integration of weight and rate.

However, the performance of belt weighing equipment still falls short of the ideal. It is known that particular designs are in ideal conditions capable of producing repeatable accuracies lying within ±0.5 percent but it is often found that the site installation and testing procedures fail to ensure a successful performance in the field. On-site calibration can be much more expensive than that of a static weighing machine due to the necessity of extracting large quantities of material from the conveying system for subsequent check weighing at a remote location. The accuracy of a belt weighing machine under its usual operating conditions is likely to be many times worse than that of a static weighing machine of similar capacity.

On installation of a belt weighing machine there are certain procedures, such as levelling the machine and the idlers, which are usually carried out. There will remain a number of unknown factors, often unique to the particular installation, which can and will affect the accuracy of the machine under different conditions of applied load. It is desirable to reduce the effect of these factors.

According to one aspect of the invention there is provided a method of installing or adjusting the performance of a belt weighing machine comprising a conveyor belt which is adapted to be driven over a series of idler rollers, one or more consecutive idler rollers being supported by a weight sensing system, which includes the steps of:

a. applying a test weight over the static belt to identify the length of the belt over which the weight is sensed, and b. in the event that the weight is sensed on the entry side of the first entry threshold idler roller or on the exit side of the first exit threshold idler roller, moving away from the relevant threshold idler roller either the adjacent non-weighed idler roller or, optionally, where there are at least four weighed idler rollers, the next but one weighed idler roller, and then c. repeating steps (a) and (b) until the weight is no longer significantly sensed on the entry side of the first entry threshold idler roller or on the exit side of the first exit threshold idler roller.

We prefer to apply the test weight on to the belt through the medium of a strip which is flexible in its longer direction but relatively stiff in its shorter direction, which is placed lengthways across the belt, the length of the strip corresponding to the width of the belt and the width of the strip corresponding to the lengths of the individual portions of the belt to which the test weight is to be applied. The strip is suitably slatted across its width. The slats then allow weights to be held in position over the whole length of the strip, i.e. over the whole width of the belt, even when the belt takes the shape of a relatively deep trough. The slats also serve to provide the relative stiffness to the strip in its shorter direction, i.e. across its width.

The object of the foregoing method is to improve the isolation between that part of the belt which is supported by the force sensing system and the remainder of the belt. We have found that good isolation can be effective to improve the stability of the results obtained with the belt weighing machine, and hence that better isolation tends to lead to more consistent performance.

In step (a) of the foregoing method we prefer to apply the test weight consecutively to adjacent portions of the static belt over the length of the belt over which the weight is sensed. In this way the test strip with its associated weight can be used to determine the load profile of the machine, which enables the difference between the actual weight sensed and the theoretical weight sensed to be found.

According to a second aspect of the invention there is provided a method of installing or adjusting the performance of a belt weighing machine comprising a conveyor belt which is adapted to be driven over a series of idler rollers, one or more consecutive idler rollers being supported by a weight sensing system which includes the steps of:

a. applying a test load to the weighed portion of the machine and adjusting the mechanism to give a correct weight reading, b. carrying a test load on the travelling belt and determining the error in the weight sensed as a proportion of the true weight, and c. adjusting the position of the first entry and/or first exit threshold idler rollers to alter the theoretical weighlength by a distance which stands in a proportion to the previous theoretical weighlength which is numerically equal to, but algebraically of opposite sign to, the proportion determined in step (b).

The theoretical weighlength is considered to be the distance between a point halfway between the entry threshold idler roller and the first weighed idler roller and a point halfway between the last weighed idler roller and the exit threshold idler roller.

It is particularly desirable to carry out this aspect of the invention subsequent to improving the isolation as previously described.

The object of this aspect of the invention is to bring the results of static and dynamic weighing into approximate agreement. It is commonly found that the dynamic tests show an error when compared with the static tests. One previous way of attempting to overcome this problem, which results in inaccurate weighing when the machine is used in its normal mode, i.e. dynamically, has been to adjust the overall calibration of the weight sensing system so as to alter the dynamic test results to show the correct figure. This does however result in static weighing giving a false result, which can complicate subsequent check testing of the machine. It has also previously been attempted to correct the error by removing the causes of the discrepancy. Since these causes can arise from many sources, it is very difficult to isolate the particular cause which is contributing most significantly to the particular error, and isolation of the cause does not necessarily mean that it can be corrected. By carrying out the method of invention dynamic weighing can be made to show approximately correct results, and the static calibration is not disturbed.

In the accompanying drawings:

FIG. 1 shows one example of a slatted strip suitable for use in carrying the test weights on the belt; and FIG. 2 represents in diagrammatic form a typical arrangement of a multi-idler weigh conveyor suited to the practice of the invention.

In FIG. 1 a flexible strip 11 is as long as the width of the belt it is to be used with, and its width is for convenience a simple fraction of the idler roller separation on the weighlength of the belt. The strip 11 carries rigid slats 12 extending across its width on its upper surface, secured by bolts 13 through the strip to further slats 14 on its lower surface. The upper slats 12 have raised beads 15 along their edges nearer the center of the strip, to help prevent the test weights from sliding to the center when the strip lies across a steeply troughed belt. Two eyebolts 16 at each end of the strip secure the end slats and allow ropes to be attached to assist in manipulating the strip in use.

In FIG. 2 a stringer 21 carries directly entry threshold idler rollers 22 and exit threshold idler rollers 23 and indirectly, through a force sensing mechanism, the weigh idler rollers 24 which extend over the weighlength. The belt 25 travels over the idlers 22, 24 and 23 from left to right as illustrated. The first entry threshold idler (the entry isolation idler) and the first exit threshold idler (the exit isolation idler) are adjustable longitudinally of the stringer 21 and are provided with datum marks on their mountings 28 and 29 indicating on scales 30 and 31 respectively on the stringer to show their exact positions.

In adjusting a belt weighing machine of this kind the flexible strip shown in FIG. 1 is first used, carrying test weights, to test whether a load on the belt is sensed outside the entry and exit isolation idlers. The loaded test strip is applied consecutively to adjacent portions of the static belt over the weighlength and beyond the isolation idlers as far as the region where the load ceases to be sensed.

If the load is sensed outside the isolation idlers, isolation is improved on the relevant side of the weighlength by increasing the separation between rollers marked in FIGS. 2A and B or C and D (or A' and B' or C' and D') while keeping the weighlength constant by not moving the rollers A or C (or A' or C'). In other words this can be expressed as increasing the distance between the isolation roller A (or A') and the roller B and/or D (or B' and/or D').

Thereafter the isolation is tested again, and if necessary the roller separations increased further, until isolation of the weighlength at the isolation rollers A and A' is substantially complete.

In the final passage of the test weight strip across the weighlength, the load profile of the adjusted weigher can be observed and recorded.

In carrying out further adjustment in accordance with the invention, the belt weighing machine is tested with a static test load and the mechanism adjusted to give a correct reading. This test may be carried out by loading the weigh carriage and running the belt through a measured distance, then comparing the reading given by the machine with the weight per meter which ought to be shown and which can be calculated from the known load and distance run.

When the mechanism has been adjusted to give the correct reading with a static test load a dynamic test is made. This involves running the machine with a load on the belt which is accurately known or can be measured, e.g. with a chain of known weight per meter length. The result obtained is likely to show an error, often reading light.

Suppose that the machine indicates less weight than has actually passed, by $x$ percent. The error is thus $-x$ percent. Rather than adjusting the weight evaluation mechanism, which would introduce an error into subsequent static tests, or attempting to find and correct small errors in the previous setting up and levelling of the whole machine, the entry and exit threshold idler rollers are moved apart, each moving along the stringer 21 by $x$ percent of their original separation. Had the error been $+x$ percent, these idlers would each have been moved towards each other by $x$ percent.

There are set out below as examples the results obtained in three actual instances of using this method of the invention, using transferred material dynamic tests — i.e. tests in which, rather than using a chain of known weight per meter, masses of material were passed over the belt weigher and were then collected and weighed statically elsewhere. This method represents the likely conditions of actual use.

In the case of the first machine the first two dynamic tests showed errors of +3.9 and +3.2 percent. The theoretical weighlength was then reduced by 3.6 percent and two subsequent tests showed errors of +0.3 and −0.4 percent respectively.

For the second machine the first two dynamic tests indicated errors of −1.8 and −2.1 percent. The theoretical weighlength of the machine was then increased by 2.1 percent and two subsequent tests showed errors of +0.8 and −0.2 percent respectively.

For the third machine the first three dynamic tests indicated errors of −7.6, −7.1 and −8.8 percent. The theoretical weighlength of the machine was then increased by 7.5 percent and two subsequent tests showed errors of −0.4 and 0.0 percent respectively.

According to previous methods, adjustment of the belt weighing machine needed to be followed by further tests to determine the effect of the adjustment, then further adjustment, then further tests, and so on until satisfactory performance was achieved. By carrying out the methods of this invention, as can be seen by the examples given, it is possible within limits to predict the results of the adjustment and so to achieve satisfactory performance without the necessity of repeated readjustment and retesting.

We claim:

1. A method of installing or adjusting the performance of a belt weighing machine comprising a conveyor belt which is adapted to be driven over a series of idler rollers, one or more consecutive idler rollers being supported by a weight sensing system, which includes the steps of:
   a. applying a test weight over the static belt to identify the length of the belt over which the weight is sensed, and
   b. in the event that the weight is sensed on the entry side of the first entry threshold idler roller or on the exit side of the first exit threshold idler roller, moving away from the relevant threshold idler roller either the adjacent non-weighed idler roller or, optionally, where there are at least four weighed idler rollers, the next but one weighed idler roller, and then c. repeating steps (a) and (b) until the weight is no longer significantly sensed on the entry side of the first entry threshold idler roller or on the exit side of the first exit threshold idler roller.

2. A method as claimed in claim 1 in which the test weight is applied to the belt through the medium of a strip which is flexible in its longer direction but relatively stiff in its shorter direction, which is placed lengthways across the belt, the length of the strip corresponding to the width of the belt.

3. A method as claimed in claim 2 in which the test weight is applied consecutively to adjacent portions of the static belt over the length of the belt over which the weight is sensed.

4. A method of installing or adjusting the performance of a belt weighing machine comprising a conveyor belt which is adapted to be driven over a series of idler rollers, one or more consecutive idler rollers being supported by a weight sensing system, which includes the steps of:

a. applying a test load to the weighed portion of the machine and adjusting the mechanism to give a correct weight reading, b. carrying a test load on the travelling belt and determining the error in the weight sensed as a proportion of the true weight, and c. adjusting the position of the fist entry and/or first exit threshold idler rollers to alter the theoretical weighlength by a distance which stands in a proportion to the previous theoretical weighlength which is numerically equal to, but algebraically of opposite sign to, the proportion determined in step (b).

5. A method as claimed in claim 4 in which step (a) is carried out by loading the weight sensing system with the belt unloaded, and running the unloaded belt through a measured distance to obtain a weight reading.

6. The sequence of a method as claimed in claim 1 followed by a method as claimed in claim 4.

* * * * *